United States Patent
Wyper et al.

(10) Patent No.: US 8,554,137 B2
(45) Date of Patent: Oct. 8, 2013

(54) METHOD AND SYSTEM FOR SHORT RANGE AND WIRELESS LAN COEXISTENCE

(75) Inventors: George Andrew Wyper, Valbonne (FR); Sven Jerlhagen, Jarfalla (SE)

(73) Assignee: Broadcom Corporation, Irvine, CA (US)

( * ) Notice: Subject to any disclaimer, the term of this patent is extended or adjusted under 35 U.S.C. 154(b) by 816 days.

(21) Appl. No.: 11/673,897

(22) Filed: Feb. 12, 2007

(65) Prior Publication Data
US 2008/0192806 A1    Aug. 14, 2008

(51) Int. Cl.
*H04B 7/00* (2006.01)
(52) U.S. Cl.
USPC ........................ 455/41.2; 455/63.1
(58) Field of Classification Search
USPC ............ 455/41.1, 41.2, 41.3, 74, 73, 39, 63.1
See application file for complete search history.

(56) References Cited

U.S. PATENT DOCUMENTS

| 2005/0191964 A1* | 9/2005 | Hundal .................... 455/63.1 |
| 2006/0030266 A1* | 2/2006 | Desai et al. ................ 455/41.2 |
| 2006/0292987 A1* | 12/2006 | Ophir et al. ................ 455/41.2 |
| 2008/0101279 A1* | 5/2008 | Russell et al. ............... 370/328 |

\* cited by examiner

*Primary Examiner* — Ping Hsieh
(74) *Attorney, Agent, or Firm* — Thomas|Horstemeyer, LLP

(57) ABSTRACT

A method and system for Bluetooth® and Wireless LAN coexistence may include controlling wireless local area network (WLAN) communication and Bluetooth® communication in a coexistence system that handles at least a WLAN communication protocol and a Bluetooth® communication protocol based on time division multiplexing (TDM) and adaptive frequency hopping (AFH). Switching may occur between the WLAN communication and the Bluetooth® communication based on the TDM and the AFH. In one embodiment of the invention, the switching may occur adaptively. Notwithstanding, in instances where it may be determined that AFH is disabled, switching to TDM may occur. WLAN communication and/or Bluetooth® communication may be disabled or enabled based on a state of at the WLAN communication and/or the Bluetooth® communication. Use of the AFH may be enabled or disabled based on a link status of the WLAN communication and/or the Bluetooth® communication.

30 Claims, 10 Drawing Sheets

METHOD AND SYSTEM FOR SHORT RANGE AND WIRELESS LAN COEXISTENCE

CROSS-REFERENCE TO RELATED APPLICATIONS/INCORPORATION BY REFERENCE

This application makes reference to:
U.S. application Ser. No. 11/387,309 filed on 23 Mar. 2006;
U.S. application Ser. No. 11/327,557 filed on 6 Jan. 2006; and
U.S. application Ser. No. 11/439,776 filed on 24 May 2006.

Each of the above referenced applications is hereby incorporated herein by reference in their entirety.

FIELD OF THE INVENTION

Certain embodiments of the invention relate to interference in wireless communication systems. More specifically, certain embodiments of the invention relate to a method and system for Bluetooth® and Wireless LAN coexistence.

BACKGROUND OF THE INVENTION

The use of Wireless Personal Area Networks (WPANs) has been gaining popularity in a great number of applications because of the flexibility and convenience in connectivity they provide. WPAN systems, such as those based on Class 2 Bluetooth® (BT) technology, generally replace cumbersome cabling and/or wiring used to connect peripheral devices and/or mobile terminals by providing short distance wireless links that allow connectivity within a 10-meter range. Though, for a limited number of applications, higher-powered Class 1 BT devices may operate within a 100-meter range. In contrast to WPAN systems, Wireless Local Area Networks (WLANs) provide connectivity to devices that are located within a slightly larger geographical area, such as the area covered by a building or a campus, for example. WLAN systems are based on IEEE 802.11 standard specifications, typically operate within a 100-meter range, and are generally utilized to supplement the communication capacity provided by traditional wired Local Area Networks (LANs) installed in the same geographic area as the WLAN system.

In some instances, WLAN systems may be operated in conjunction with WPAN systems to provide users with an enhanced overall functionality. For example, Bluetooth® technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building.

Both Bluetooth® and WLAN radio devices, such as those used in, for example, handheld wireless terminals, generally operate in the 2.4 GHz (2.4000-2.4835 GHz) Industrial, Scientific, and Medical (ISM) unlicensed band. Other radio devices, such as those used in cordless phones, may also operate in the ISM unlicensed band. While the ISM band provides a suitable low-cost solution for many of short-range wireless applications, it may also have some drawbacks when multiple users operate simultaneously. For example, because of the limited bandwidth, spectrum sharing may be necessary to accommodate multiple users. Multiple active users may also result in significant interference between operating devices. Moreover, in some instances, microwave ovens may also operate in this frequency spectrum and may produce significant interference or blocking signals that may affect Bluetooth® and/or WLAN transmissions.

When operating a Bluetooth® radio and a WLAN radio in, for example, a wireless device, at least two different types of interference effects may occur. First, when an interfering signal is present in a transmission medium along with the signal-of-interest, a low signal-to-noise-plus-interference ratio (SINR) may result. In this instance, for example, a Bluetooth® signal may interfere with a WLAN signal or a WLAN signal may interfere with a Bluetooth® signal. The second effect may occur when the Bluetooth® and WLAN radio devices are collocated, that is, when they are located in close proximity to each other so that there is a small radio frequency (RF) path loss between their corresponding radio front-end receivers. In this instance, the isolation between the Bluetooth® radio front-end and the WLAN radio front-end may be as low as 10 dB, for example. As a result, one radio may desensitize the front-end of the other radio upon transmission. Moreover, since Bluetooth® employs transmit power control, the collocated Bluetooth® radio may step up its power level when the signal-to-noise ratio (SNR) on the Bluetooth® link is low, effectively compromising the front-end isolation between radio devices even further. Low noise amplifiers (LNAs) in the radio front-ends may not be preceded by a channel selection filter and may be easily saturated by the signals in the ISM band, such as those from collocated transmissions. The saturation may result in a reduction in sensitivity or desensitization of the receiver portion of a radio front-end, which may reduce the radio front-end's ability to detect and demodulate the desired signal.

Packet communication in WLAN systems requires acknowledgement from the receiver in order for the communication to proceed. When the isolation between collocated radio devices is low, collisions between WLAN communication and Bluetooth® communication, due to greater levels of mutual interference than if the isolation were high, may result in a slowdown of the WLAN communication, as the access point does not acknowledge packets. This condition may continue to spiral downwards until the access point drops the WLAN station. If, in order to avoid this condition, WLAN communication in collocated radio devices is given priority over all Bluetooth® communication, then isochronous Bluetooth® packet traffic, which does not have retransmission capabilities, may be starved of communication bandwidth. Moreover, this approach may also starve other Bluetooth® packet traffic of any communication access.

Different techniques have been developed to address the low isolation problem that occurs between collocated Bluetooth® and WLAN radio devices in coexistent operation. These techniques may take advantage of either frequency and/or time orthogonality mechanisms to reduce interference between collocated radio devices. Moreover, these techniques may result from so-called collaborative or non-collaborative mechanisms in Bluetooth® and WLAN radio devices, where collaboration refers to any direct communication between the protocols. For example, Bluetooth® technology utilizes Adaptive Frequency Hopping (AFH) as a frequency division multiplexing (FDM) technique that minimizes channel interference. In AFH, the physical channel is characterized by a pseudo-random hopping, at a rate of 1600 hops-per-second, between 79 1 MHz channels in the Bluetooth® piconet. AFH provides a non-collaborative mechanism that may be utilized by a Bluetooth® device to avoid frequencies occupied by a spread spectrum system such as a WLAN system. In some instances, the Bluetooth® radio may be adapted to modify its hopping pattern based on, for example, frequencies in the ISM spectrum that are not being occupied by other users.

Even when frequency division multiplexing techniques are applied, significant interference may still occur because a strong signal in a separate channel may still act as a blocking signal and may desensitize the radio front-end receiver, that is, increase the receiver's noise floor to the point that the received signal may not be clearly detected. For example, a collocated WLAN radio front-end transmitter generating a 15 dBm signal acts as a strong interferer or blocker to a collocated Bluetooth® radio device receiver when the isolation between radio devices is only 10 dB. Similarly, when a Bluetooth® radio device is transmitting and a WLAN radio device is receiving, particularly when the Bluetooth® radio front-end transmitter is operating as a 20 dBm Class 1 type, the WLAN radio device receiver may be desensitized by the Bluetooth® transmission as the isolation between radios is reduced.

Other techniques may be based on collaborative coexistence mechanisms, such as those described in the IEEE 802.15.2—2003 Recommended Practice for Information Technology—Part 15.2: Coexistence of Wireless Personal Area Networks with Other Wireless Devices Operating in the Unlicensed Frequency Bands. For example, these techniques may comprise Medium Access Control (MAC) layer mechanisms or Physical (PHY) layer mechanisms. The MAC layer techniques may comprise, for example, the Alternating Wireless Medium Access (AWMA) technique or the Packet Traffic Arbitration (PTA) technique. Both the AWMA and the PTA techniques provide a time division multiplexing (TDM) approach to the collocated radio device isolation problem. For example, the AWMA technique partitions a WLAN communication interval into two segments: one for the WLAN system and one for the WPAN system. Each wireless system is then restricted to transmissions in their allocated time segments. On the other hand, the PTA technique provides for each communication attempt by either a collocated WLAN radio device or a Bluetooth® radio device to be submitted for arbitration and approval. The PTA may then deny a communication request that would result in collision or interference. The PHY layer technique may comprise, for example, a programmable notch filter in the WLAN radio device receiver to filter out narrow-band WPAN or Bluetooth® interfering signals. These techniques may result in some transmission inefficiencies or in the need of additional hardware features in order to achieve better coexistent operation.

Other collaborative coexistence mechanisms may be based on proprietary technologies. For example, in some instances, firmware in the collocated WLAN radio device may be utilized to poll a status signal in the collocated Bluetooth® radio device to determine whether Bluetooth® communication is to occur. However, polling the Bluetooth® radio device may have to be performed on a fairly constant basis and may detract the WLAN radio device from its own WLAN communication operations. If a polling window is utilized instead, where the polling window may be as long as several hundred microseconds, the WLAN radio device has adequate time available to poll the BT radio device, which may indicate that BT communication is to occur. In other instances, the collocated WLAN and Bluetooth® radio devices may utilize an interrupt-driven arbitration approach. In this regard, considerable processing time may be necessary for handling the interrupt operation and to determine the appropriate communication schedule based on the priority and type of WLAN and Bluetooth® packets.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for Bluetooth® and Wireless LAN coexistence, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and apparatus for Bluetooth® and Wireless LAN coexistence. Various exemplary aspects of the invention may comprise controlling wireless local area network (WLAN) communication and Bluetooth® communication in a coexistence system that handles at least a WLAN communication protocol and a Bluetooth® communication protocol based on time division multiplexing (TDM) and adaptive frequency hopping (AFH). Communication may occur between the WLAN communication and the Bluetooth® communication based on the TDM and the AFH. In one embodiment of the invention, the switching may occur adaptively. Notwithstanding, in instances where it may be determined that AFH is disabled, switching to TDM may occur.

In accordance with an embodiment of the invention, WLAN communication and/or Bluetooth® communication may be disabled based on a state of the WLAN communication and/or the Bluetooth® communication. Use of the AFH may be enabled based on a link status of the WLAN communication and/or the Bluetooth® communication. Bluetooth® communication and/or WLAN communication may be disabled based on a state of the WLAN communication and/or the Bluetooth® communication. Use of the AFH may be disabled based on a link status of the WLAN communication and/or the Bluetooth® communication. A coexistence interface may be utilized to communicate corresponding state information associated with the WLAN communication and the Bluetooth® communication between a WLAN radio providing the WLAN communication and a Bluetooth® radio providing the Bluetooth® communication. The coexistence interface may comprise, for example, a 2-wire interface, a 3-wire interface, a 4-wire interface, or other suitable interface.

Figure 1A:
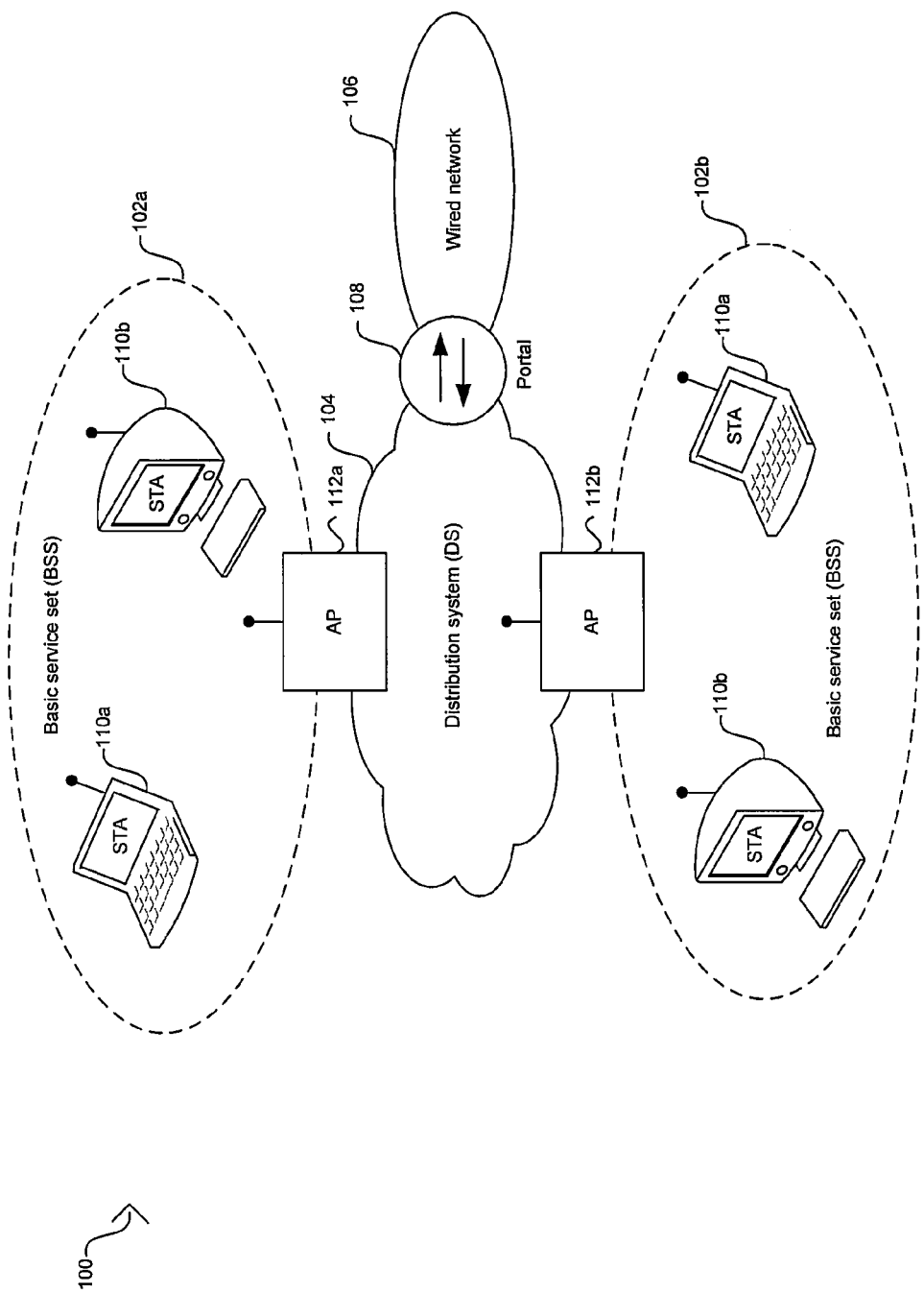
FIG. 1A is a block diagram of an exemplary WLAN infrastructure network comprising basic service sets (BSSs) integrated using a common distribution system (DS), in connection with an embodiment of the invention.

FIG. 1A is a block diagram of an exemplary WLAN infrastructure network comprising basic service sets (BSSs) integrated using a common distribution system (DS), in connection with an embodiment of the invention. Referring to FIG. 1A, the exemplary WLAN infrastructure network 100 shown may comprise a first BSS 102a, a second BSS 102b, a DS 104, a wired network 106, a portal 108, a first access point (AP) 112a, a second AP 102b, and a plurality of WLAN stations (STAs). The BSSs 102a and 102b may represent a fundamental building block of the IEEE 802.11 (WLAN) architecture and may be defined as a group of stations (STAs) that are under the direct control of a single coordination function. The geographical area covered by a BSS is known as the basic service area (BSA). The DS 104 may be utilized to integrate the BSSs 102a and 102b and may comprise suitable hardware, logic, circuitry, and/or code that may be adapted to operate as a backbone network that is responsible for Medium Access Control (MAC) level transport in the WLAN infrastructure network 100. The DS 104, as specified by the IEEE 802.11 standard, is implementation independent. For example, the DS 104 may be implemented utilizing IEEE 802.3 Ethernet Local Area Network (LAN), IEEE 802.4 token bus LAN, IEEE 802.5 token ring LAN, Fiber Distributed Data Interface (FDDI) Metropolitan Area Network (MAN), or another IEEE 802.11 wireless medium. The DS 104 may be implemented utilizing the same physical medium as either the first BSS 102a or the second BSS 102b. However, the DS 104 is logically different from the BSSs and may be utilized only to transfer packets between the BSSs and/or to transfer packets between the BSSs and the wired network 106.

The wired network 106 may comprise suitable hardware, logic, circuitry, and/or code that may be adapted to provide wired networking operations. The wired network 106 may be accessed from the WLAN infrastructure network 100 via the portal 108. The portal 108 may comprise suitable hardware, logic, circuitry, and/or code and may be adapted to integrate the WLAN infrastructure network 100 with non-IEEE 802.11 networks. Moreover, the portal 108 may also be adapted to perform the functional operations of a bridge, such as range extension and/or translation between different frame formats, in order to integrate the WLAN infrastructure network 100 with IEEE 802.11-based networks.

The APs 112a and 112b may comprise suitable hardware, logic, circuitry, and/or code that may be adapted to support range extension of the WLAN infrastructure network 100 by providing the integration points necessary for network connectivity between the BSSs. The STA 110a and the STA 110b correspond to WLAN-enabled terminals that comprise suitable hardware, logic, circuitry, and/or code that may be adapted to provide connectivity to the WLAN infrastructure network 100 via the APs. The STA 110a shown is a laptop computer and may correspond to a mobile station or terminal within the BSS and the STA 110b shown is a desktop computer and may correspond to a fixed or stationary terminal within the BSS. Each BSS may comprise a plurality of mobile or fixed stations and may not be limited to the exemplary implementation shown in FIG. 1A.

Figure 1B:
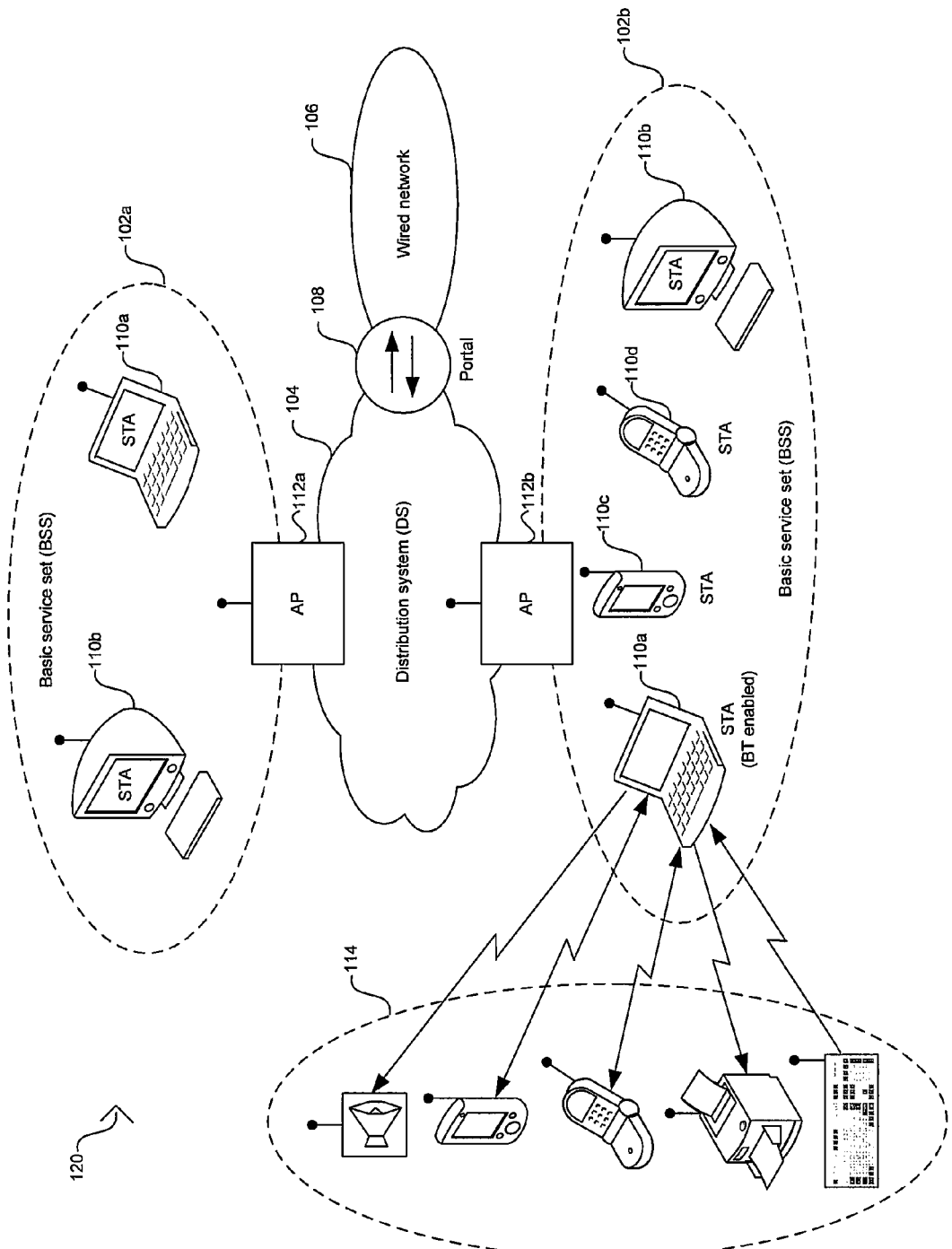
FIG. 1B is a block diagram of an exemplary WLAN infrastructure network comprising a basic service set (BSS) with stations that support WLAN/Bluetooth® coexistence, in accordance with an embodiment of the invention.

FIG. 1B is a block diagram of an exemplary WLAN infrastructure network comprising a basic service set (BSS) with stations that support WLAN/Bluetooth® coexistence, in accordance with an embodiment of the invention. Referring to FIG. 1B, the exemplary WLAN infrastructure network 120 shown differs from the WLAN infrastructure network 100 in FIG. 1A in that at least one BSS comprises at least one station or terminal that supports Bluetooth® technology. In this regard, the second BSS 102b comprises additional mobile terminals or stations such as a Personal Digital Assistant (PDA) 110c and a mobile phone 110d while the laptop computer 110a is now shown to be Bluetooth®-enabled. The peripheral devices 114 shown may be part of the Wireless Personal Area Network (WPAN) supported by the Bluetooth®-enabled laptop computer. For example, the laptop computer 110a may communicate via Bluetooth® technology with a keyboard, a mouse, a printer, a mobile phone, a PDA, and/or a set of headphones or speakers, where these devices and the laptop computer 110a may form an ad-hoc Bluetooth® piconet. Generally, a Bluetooth® piconet may comprise a master device or terminal and up to seven slave devices or terminals. In this exemplary implementation, the laptop computer 110a may correspond to the master Bluetooth® terminal and the peripheral devices 114 may correspond to the slave Bluetooth® terminals.

The Bluetooth®-enabled laptop computer 110a in FIG. 1B may comprise a WLAN radio device and a Bluetooth® radio device that may allow it to communicate with the WLAN infrastructure network 100 via the AP 112b and with the Bluetooth® piconet respectively. Because of the size of the laptop computer 110a, locating the WLAN and BT radio devices in the same terminal may result in signal interference between WLAN and BT communications. When the PDA 110c and/or the mobile phone 110d are Bluetooth®-enabled, the small form factor of these coexistence terminals may result in a small radio frequency (RF) path loss between WLAN and BT radio devices and likely interference between WLAN and BT communications.

Figure 1C:
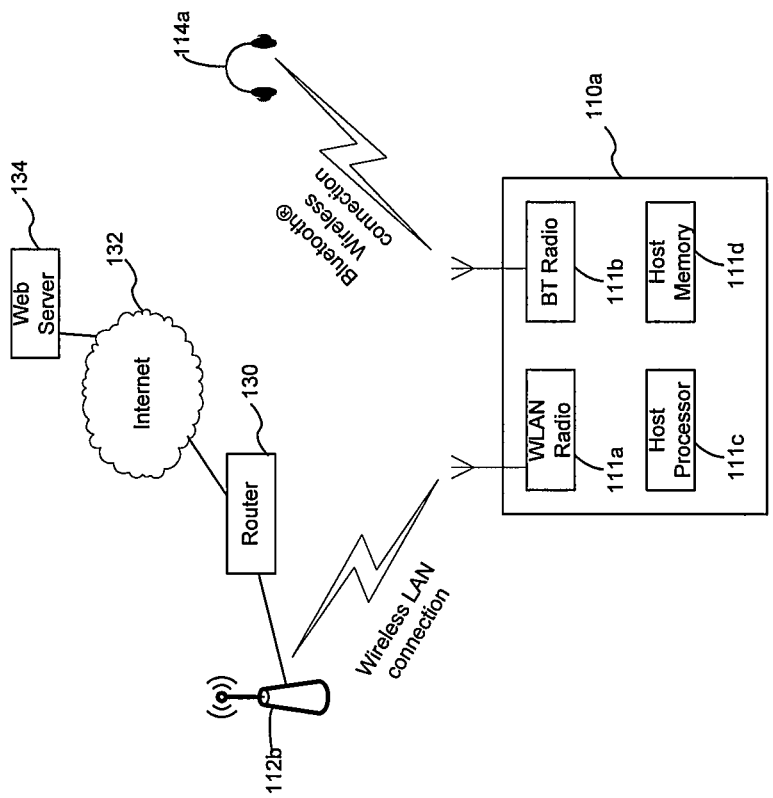
FIG. 1C is a diagram illustrating an exemplary WLAN and Bluetooth® wireless communication system, in connection with an embodiment of the invention.

FIG. 1C is a diagram illustrating an exemplary WLAN and Bluetooth® wireless communication system, in connection with an embodiment of the invention. Referring to FIG. 1, there is shown a WLAN access point 112b, a computer 110a, a Bluetooth® headset 114a, a router 130, the Internet 132 and a web server 134. The computer or host device 110a may comprise a wireless LAN (WLAN) radio 111a, a Bluetooth® radio 111b, a host processor 111c, and a host memory 111d. There is also shown a Wireless LAN (WLAN) connection between the wireless LAN radio 111a and the wireless LAN access point 112b, and a Bluetooth® wireless connection between the Bluetooth® radio 111b and the Bluetooth(D headset 114a.

Frequently, computing and communication devices may comprise hardware and software to communicate using multiple wireless communication standards. The WLAN radio 111a may be compliant with IEEE 802.11 standard. There may be instances when the WLAN radio 111a and the Bluetooth® radio 111b are active concurrently. For example, it may be desirable for a user of the computer or host device 110a to access the Internet 132 in order to consume streaming content from the Web server 134. Accordingly, the user may establish a WLAN connection between the computer 110a and the access point 112b. Once this connection is established, the streaming content from the Web server 134 may be received via the router 130, the access point 112b, and the WLAN connection, and consumed by the computer or host device 110a.

It may be further desirable for the user of the computer 110a to listen to an audio portion of the streaming content on the Bluetooth® headset 114a. Accordingly, the user of the computer 110a may establish a Bluetooth® wireless connection with the Bluetooth® headset 114a. Once the Bluetooth® wireless connection is established, and with suitable configurations on the computer enabled, the audio portion of the streaming content may be consumed by the Bluetooth® headset 114a.

In this scenario, the Bluetooth® radio 111b and the WLAN 802.11 radio 111a located in the computer or host device 110a may interfere with each other. The WLAN access point 112b and the Bluetooth® headset 114a may also interfere with each other. However, since the separation distance between the WLAN access point 112b and the Bluetooth® headset 114a may be much larger than the separation between the WLAN radio 111a and the Bluetooth® radio 111b on computer 110a, the interference may be comparatively smaller.

Figure 1D:
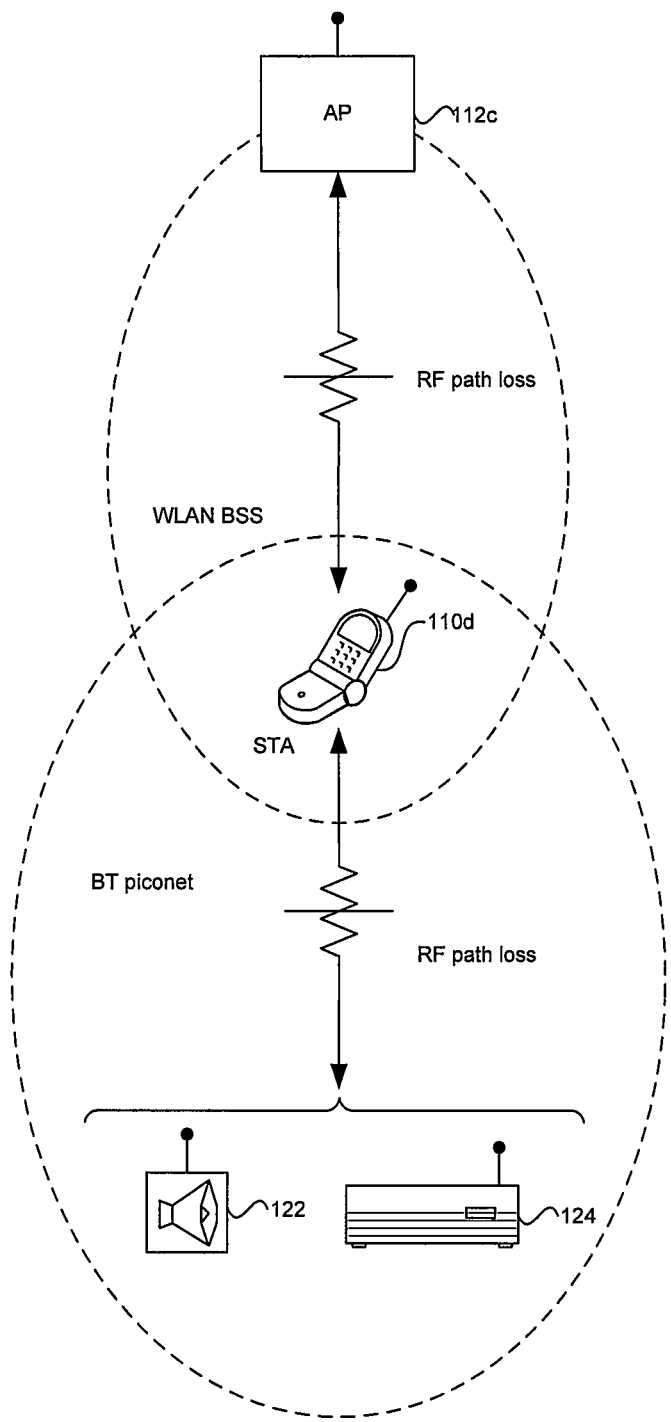
FIG. 1D is a block diagram that illustrates an exemplary usage model for a coexistence terminal with collocated WLAN and Bluetooth® radio devices, in accordance with an embodiment of the invention.

FIG. 1D is a block diagram that illustrates an exemplary usage model for a coexistence terminal with collocated WLAN and Bluetooth® radio devices, in accordance with an embodiment of the invention. Referring to FIG. 1D, the mobile phone 110d may comprise a WLAN radio device to communicate with the AP 112c. The RF path loss between the AP 112c and the mobile phone 110d may be, for example, 65 dB for 10 meters. The IEEE 802.15.2, for example, provides a formula for calculating the RF path loss. The mobile phone 110d may also be Bluetooth®-enabled and may comprise a Bluetooth® radio device to communicate with, for example, a Bluetooth® headset 122 and/or a home gateway 124 with Bluetooth® cordless telephony capability. Because of the small form factor of the mobile phone 110d, the WLAN and Bluetooth® radio devices may be in such close proximity to each other within the same coexistence terminal that the isolation between them is sufficiently low to allow desensitization of one radio device by the other's transmissions.

The Bluetooth®-enabled mobile phone 110d may comprise two maximum transmission power levels. For example, the mobile phone 110d may operate as a Class 1 power level terminal with a maximum transmission power of 20 dBm to communicate with the home gateway 124. In another example, the mobile phone 110d may operate as a Class 2 power level terminal with a maximum transmission power of 4 dBm to communicate with the Bluetooth® headset 122. The Bluetooth® headset 122 may comprise suitable hardware, logic, circuitry, and/or code that may be adapted to receive and/or transmit audio information. For example, the Bluetooth® handset 122 may be adapted to receive and/or transmit Continuous Variable Slope Delta (CVSD) modulated voice from the mobile phone 110d or receive A2DP, such as MP3, from the mobile phone 110d. The home gateway 124 may comprise suitable hardware, logic, circuitry, and/or code that may be adapted to receive and/or transmit data and/or audio information. For example, the home gateway 124 may receive and/or transmit 64 kb/s CVSD modulated voice.

In operation, the mobile phone 110d may receive voice or audio content from the WLAN infrastructure network via the AP 112c and may communicate the voice or audio contents to the Bluetooth® headset 122 or the voice contents to the home gateway 124. Similarly, the Bluetooth® headset 122 the home gateway 124 may communicate voice contents to the Bluetooth®-enabled mobile phone 110d which in turn may communicate the voice contents to other users through the WLAN infrastructure network.

A Bluetooth®-enabled station, such as the Bluetooth®-enabled mobile phone 110d in FIG. 1D, for example, may support the communication of multiple Bluetooth® connection types. For example, a Bluetooth®-enabled station may support common connection types, synchronous connection-oriented (SCO) logical transport connections, extended SCO (eSCO) logical transport connections, and/or asynchronous connection-oriented (ACL) logical transport connections.

Figure 2:
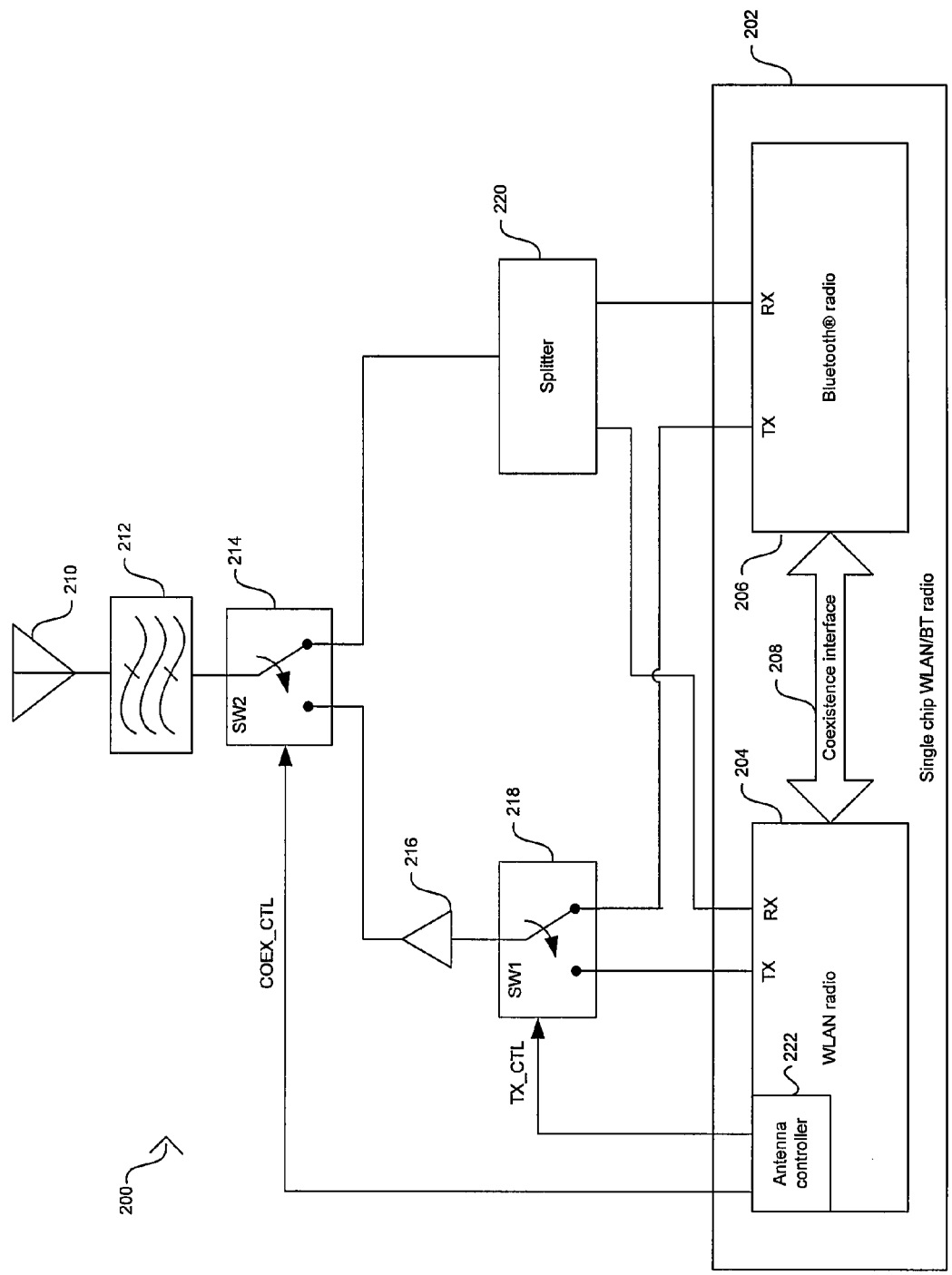
FIG. 2 is a block diagram illustrating an exemplary implementation of a single integrated circuit that supports WLAN and Bluetooth® radio operations with one antenna, in accordance with an embodiment of the invention.

FIG. 2 is a block diagram illustrating an exemplary implementation of a single integrated circuit that supports WLAN and Bluetooth® radio operations with one antenna, in accordance with an embodiment of the invention. Referring to FIG. 2, the WLAN/Bluetooth® collaborative radio architecture 200 may comprise a single antenna 210, a bandpass filter 212, a first antenna switch (SW1) 218, a second antenna switch (SW2) 214, a power amplifier (PA) 216, a splitter 220, and a single chip WLAN/Bluetooth® (WLAN/BT) radio device 202. The single chip WLAN/BT radio device 202 may comprise a WLAN radio portion 204 and a Bluetooth® radio portion 206. The WLAN radio portion 204 may comprise an antenna controller 222. There is also shown a coexistence interface 208.

The single antenna 210 may comprise suitable logic, circuitry, and/or code that may be adapted to provide transmission and reception of Bluetooth® and WLAN communication. In this regard, the single antenna 210 may be utilized for transmission and reception of a plurality of communication protocols. The bandpass filter 212 may comprise suitable hardware, logic, and/or circuitry that may be adapted to perform bandpass filtering on communication signals. The bandpass filter 212 may be implemented by utilizing a polyphase filter, for example. The bandpass filter 212 may be configured to conform to the bandpass requirements for the ISM band.

The SW1 218 and the SW2 214 may comprise suitable logic, circuitry, and/or code that may be adapted to select from signals at two input ports one that may be connected to an output port. The SW1 218 and SW2 214 may be implemented by utilizing, for example, single pull double throw (SPDT) switching devices. The selection operation of the SW1 218 may be controlled by a control signal such as a WLAN transmission control (TX_CTL) signal generated by the antenna controller 222. The selection operation of the SW2 214 may be controlled by a control signal such as the coexistence control (COEX_CTL) signal generated by the antenna controller 222.

The WLAN radio portion 204 in the single chip WLAN/BT radio device 202 may comprise suitable logic, circuitry, and/or code that may be adapted to process WLAN protocol packets for communication. The antenna controller 222 in the WLAN radio portion 204 may comprise suitable logic, circuitry, and/or code that may be adapted to generate at least the TX_CTL and/or COEX_CTL control signals for configuring the station to receive and/or transmit WLAN and/or Bluetooth® data. As shown, the WLAN radio portion 204 may comprise separate ports for transmission (Tx) and reception (Rx) of WLAN packet traffic. However, a single TX/RX port may also be utilized for WLAN communication. The WLAN radio portion 204 may be adapted to generate and/or receive at least one signal over the coexistence interface 208 for controlling and/or scheduling collaborative communication with the Bluetooth® radio portion 206.

The Bluetooth® radio portion 206 may comprise suitable logic, circuitry, and/or code that may be adapted to process Bluetooth® protocol packets for communication. As shown, the Bluetooth® radio portion 206 may comprise separate ports for transmission (Tx) and reception (Rx) of Bluetooth® packet traffic. However, a single TX/RX port may also be utilized for Bluetooth® communication. The Bluetooth® radio portion 206 may be adapted to generate and/or receive at least one signal over the coexistence interface 208 for controlling and/or scheduling collaborative communication with the WLAN radio portion 204.

In some instances, either WLAN communication or Bluetooth® communication may be disabled and the station may not operate in a coexistence mode. When the WLAN communication is disabled, the SW1 218 and/or the SW2 214 may utilize a default configuration to support Bluetooth® communication. When the Bluetooth® communication is disabled, the SW1 218 and/or the SW2 214 may utilize a default configuration to support WLAN communication.

The splitter 220 may comprise suitable hardware, logic, and/or circuitry that may be adapted to split a received communication data into a BT received data and a WLAN received data. The splitter 220 may be utilized to support separate Bluetooth® reception and transmission paths and to reduce the need to arbitrate or schedule simultaneous Bluetooth® and WLAN receptions. In some instances, another switch may be utilized to bypass the splitter 220 and reduce the implementation loss when operating in a WLAN-only or Bluetooth®-only mode. The PA 216 may comprise suitable logic, circuitry, and/or code that may be adapted to amplify Bluetooth® and/or WLAN transmission signals. The PA 216 may provide, for example, a 20 dB gain and may be implemented on-chip or off-chip. In this regard, the PA 216 may be utilized to provide class 1 operations for Bluetooth® transmissions.

Figure 3:
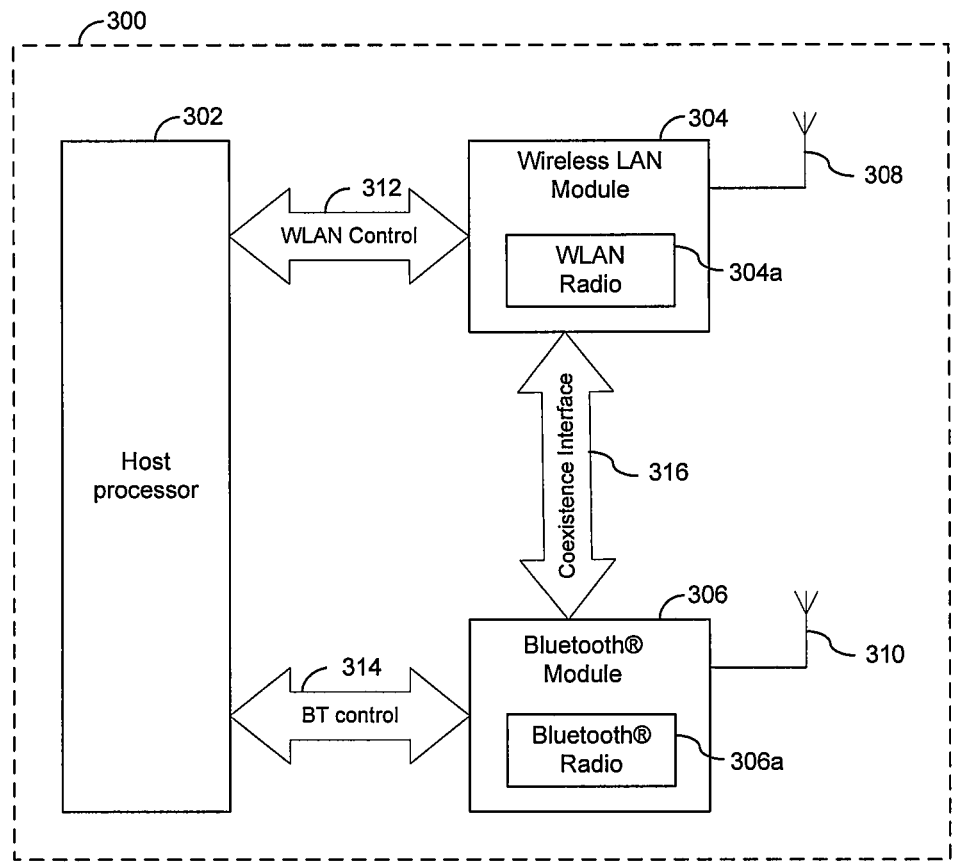
FIG. 3 is a block diagram illustrating an exemplary configuration of a multi-modal communications device comprising an IEEE 802.11-compliant Wireless LAN radio and a Bluetooth® radio, in accordance with an embodiment of the invention.

FIG. 3 is a block diagram illustrating an exemplary configuration of a multi-modal communications device comprising an IEEE 802.11-compliant Wireless LAN radio and a Bluetooth® radio, in accordance with an embodiment of the invention. Referring to FIG. 3, there is shown a communications system 300 comprising a host processor 302, a Wireless LAN (WLAN) module 304, a Bluetooth® module 306 and antennas 308 and 310. The WLAN module 304 may comprise a WLAN radio 304a and the Bluetooth® module 306 may comprise a Bluetooth® radio 306a. There is also shown a WLAN control interface 312, a BT (Bluetooth®) control interface 314, and a coexistence interface 316.

The communications system 300 as illustrated in FIG. 3 may be part of a multi-modal communications device such as the computer 110a shown in FIG. 1C. The communications system 300 comprises a host processor 302 that may be a high-level control entity of the communications system. The WLAN module 304 may comprise an IEEE 802.11-compliant WLAN radio 304a that may be a transmitter and receiver. The Bluetooth® module 306 may comprise a Bluetooth® compliant Bluetooth® radio 306a that may be a transmitter and receiver. The WLAN module 304 and the Bluetooth® module 306 may be connected to antenna 308 and antenna 310, respectively. The WLAN module 304 may be controlled by the host processor 302 via the WLAN control interface 312. The Bluetooth® module 306 may be controlled by the host processor 302 via the BT control interface 314.

Figure 4:
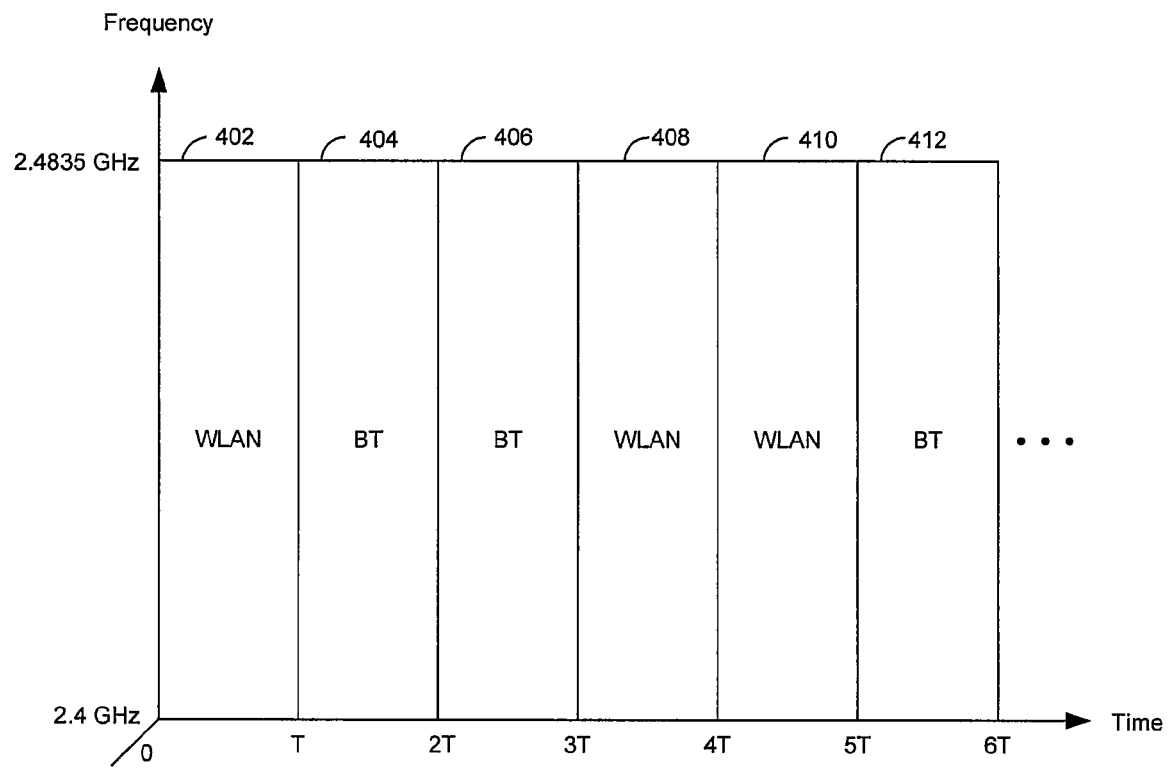
FIG. 4 is a diagram illustrating time division multiplexing (TDM), in connection with an embodiment of the invention.

There is also shown a coexistence interface 316 between the WLAN module 304 and the Bluetooth® module 306. Some communication systems comprising a WLAN module 304 and a Bluetooth® module 306 collocated in close proximity may use a coexistence interface 316 to provide Time Division Multiplexing (TDM) between the WLAN radio 304a and the Bluetooth® radio 306a. TDM is illustrated in FIG. 4. When using TDM, the WLAN module 304 and the Bluetooth® module 306 may exchange control information and/or status information over the coexistence interface 316. Such data may contain information about upcoming transmissions on the WLAN radio 304a and the Bluetooth® radio 306a. This data may be used by the WLAN module 304 and the Bluetooth® module 306 to negotiate which module may occupy the available spectrum at a given time. In this manner, the WLAN module 304 and the Bluetooth® module 306 may divide time into finite-length time slots and may multiplex slot usage between them, hence the name time division multiplexing, as illustrated in FIG. 4 Although this method may result in interference-free operation of both the WLAN module 304 and the Bluetooth® module 306, it may be inefficient and may result in a throughput penalty. Since TDM may require a connection between the WLAN module 304 and the Bluetooth® module 306, it may be implemented in a system where the WLAN module 304 and the Bluetooth® module 306 may be collocated. Exemplary coexistence interfaces to negotiate TDM may include, but are not limited to, 2-wire interface or 3-wire interface, illustrated in FIG. 5A and FIG. 5B.

There may be instances when TDM may be less effective than adaptive frequency hopping (AFH). Hence, AFH may be preferred over TDM, for example, in such instances. However, for compatibility reasons, certain Bluetooth® states and functions may require AFH to be disabled. This may include Bluetooth® connection setup and maintenance operations. In heavy WLAN traffic emanating from the WLAN module 304, it may become difficult to establish, for example, a new Bluetooth® link. Accordingly, in various embodiments of the invention, TDM may be used in instances when AFH may be disabled.

FIG. 4 is a diagram illustrating time division multiplexing (TDM), in connection with an embodiment of the invention. Referring to FIG. 4, there are shown time slots 402, 404, 406, 408, 410 and 412. There is also shown in FIG. 4, a frequency axis and a time axis.

Time Division Multiplexing (TDM) may be a method to divide limited resources among competing entities by awarding finite-length time slots to entities, which may exclusively use the resource available in the assigned time slot. In the case of Wireless LAN (WLAN) and Bluetooth®, slots of length T seconds may be allocated to either WLAN usage or Bluetooth® usage. As illustrated in FIG. 4, a WLAN radio or Bluetooth® radio may use the entire available frequency spectrum in an allocated time slot and the allocation of time slots may not be regular but based on negotiated need. The time slots may also be of variable length. For example, when TDM is in use, the Bluetooth® module 306 may negotiate via the coexistence interface 316 with the WLAN module 304 depicted in FIG. 3, about which module may access the available frequency band. In an exemplary embodiment of the invention, in the first six time slots shown in FIG. 4, the WLAN radio 304a may use time slots 402, 408, 410 and the Bluetooth® radio 406a may use time slots 404, 406 and 412.

Figure 5A:
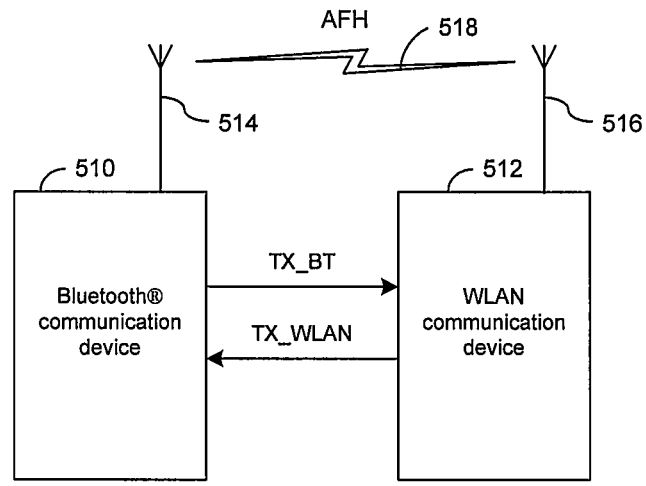
FIG. 5A is a block diagram illustrating an exemplary 2-wire Bluetooth®/WLAN coexistence interface, which may be utilized in connection with an embodiment of the invention.

FIG. 5A is a block diagram illustrating an exemplary 2-wire Bluetooth®/WLAN coexistence interface, which may be utilized in connection with an embodiment of the invention. Referring to FIG. 5A, there is shown the signal TX_BT and the signal TX_WLAN between the Bluetooth® communication device 510 and the WLAN communication device 512. The signal TX_BT may be controlled by the Bluetooth® communication device 510, and the signal TX_WLAN may be controlled by the WLAN communication device 512. There is also shown in FIG. 5A, antennas 514 and 516. Antenna 516 may be communicatively coupled to and controlled by the WLAN communication device 512. Antenna 514 may be communicatively coupled to and controlled by the Bluetooth® communication device 510. Bluetooth® communication device 510 may monitor the ISM frequency spectrum through antenna 514 and may observe the frequency band occupied by the transmission 518 of WLAN communications device 512. This information may be used to control AFH at the Bluetooth® communication device 510. An exemplary coexistence interface 316 illustrated in FIG. 3 may comprise a 2-wire interface comprising TX_BT and TX_WLAN and transmission 518. The 2-wire interface may be used to control TDM functionality.

The Bluetooth® communication device 510 may have high priority packets and low priority packets to transmit. High priority packets may be those that need to be delivered within a certain time. For example, voice packets may be high priority packets. Other examples of high priority packets may be packets involved in setting up a piconet. When the Bluetooth® communication device 510 has high priority packets to transmit, it may assert the signal TX_BT. Upon recognizing that the signal TX_BT has been asserted by the Bluetooth® communication device 510, the WLAN communication device 512 may stop transmitting all packets, regardless of the priority of the packets.

When the WLAN communication device 512 has data to transmit, it may assert the signal TX_WLAN. If the Bluetooth® communication device 510 is transmitting low priority data, it may stop transmitting the data. However, if the Bluetooth® communication device 510 is transmitting high priority data, it may assert the signal TX_BT. The WLAN communication device 512 may then defer transmission of its data. Accordingly, the 2-wire coexistence interface may be used to alleviate interference that may occur when a Bluetooth® communication device and a WLAN device transmit at the same time.

Figure 5B:
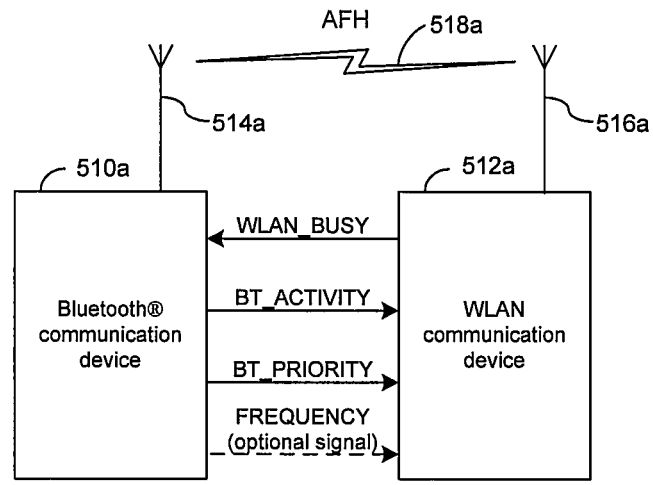
FIG. 5B is a block diagram illustrating an exemplary 3-wire Bluetooth®/WLAN coexistence interface, which may be utilized in connection with an embodiment of the invention.

FIG. 5B is a block diagram illustrating an exemplary 3-wire Bluetooth®/WLAN coexistence interface, which may be utilized in connection with an embodiment of the invention. Referring to FIG. 5B, there is shown the signals WLAN_BUSY, BT_ACTIVITY, BT_PRIORITY, and FREQUENCY between the Bluetooth® communication device 510a and the WLAN communication device 512a. The signal WLAN_BUSY may be controlled by the WLAN communication device 512a and the signal BT_ACTIVITY, BT_PRIORITY, and the signal FREQUENCY may be controlled by the Bluetooth® communication device 510a. The signal FREQUENCY may be an optional signal. There is also shown in FIG. 5B, antennas 514a and 516a. Antenna 516a may be communicatively coupled to and controlled by the WLAN communication device 512a. Antenna 514a may be communicatively coupled to and controlled by the Bluetooth® communication device 510a. Bluetooth® communication device 510a may monitor the ISM frequency spectrum through antenna 514a and may observe the frequency band occupied by the transmission 518a of WLAN communications device 512a. This information may be used to control AFH at the Bluetooth® communication device 510a. An exemplary coexistence interface 316 illustrated in FIG. 3 may comprise a 3-wire interface comprising WLAN_BUSY, BT_ACTIVITY, BT_PRIORITY and, optionally, FREQUENCY, and transmission 518a. The 3-wire interface may be used to control TDM functionality.

The signal BT_ACTIVITY may be asserted whenever there is any transmission by the Bluetooth® communication device 510a. The signal BT_PRIORITY may be used to signal a priority of a specific Bluetooth® packet that is being transmitted by the Bluetooth® communication device 510a. If the signal BT_PRIORITY is not asserted, the WLAN communication device 512a may assert the signal WLAN_BUSY when it has data to transmit. Since the Bluetooth® communication device 510a is transmitting low priority data, it may stop transmitting data. The optional signal FREQUENCY may be asserted by the Bluetooth® communication device 510a when the next packet is going to be in the WLAN band. Accordingly, the 3-wire coexistence interface may be used to alleviate interference that may occur when a Bluetooth® communication device and a WLAN device transmits at the same time.

Figure 6:
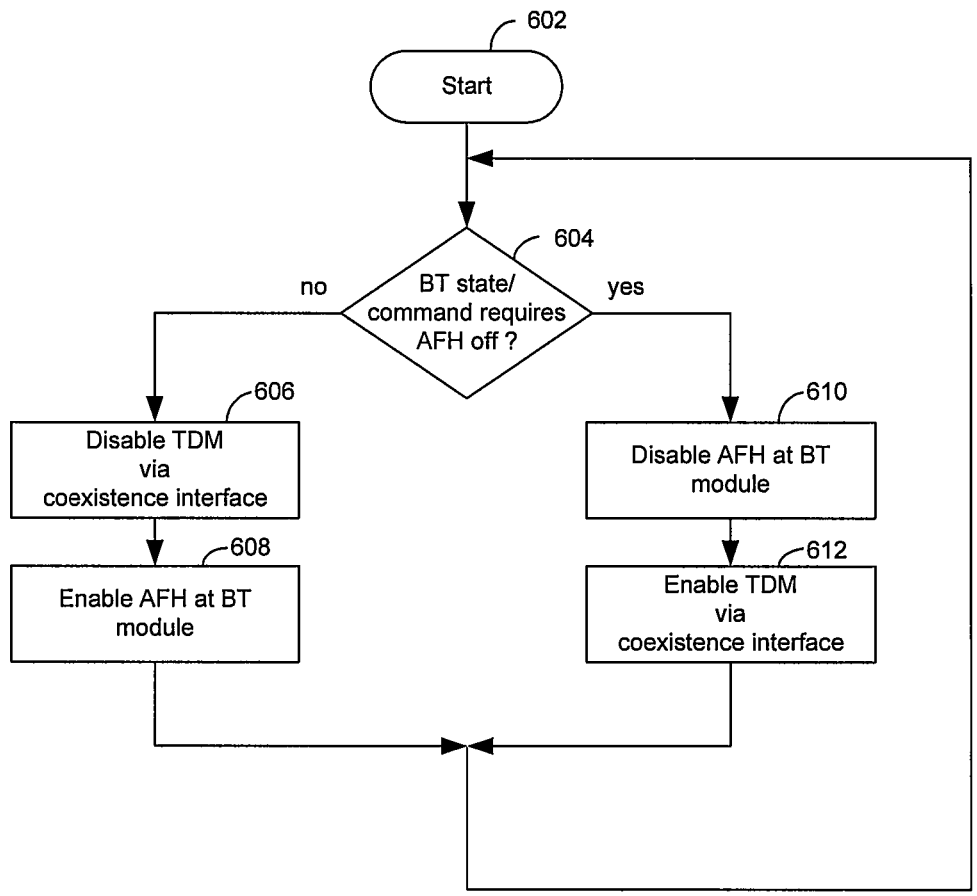
FIG. 6 is a flow diagram illustrating an exemplary selection process between TDM and AFH mode, in accordance with an embodiment of the invention.

FIG. 6 is a flow diagram illustrating an exemplary selection process between TDM and AFH mode, in accordance with an embodiment of the invention. Referring to FIG. 6, there is shown a start step 602, a decision step 604 and process steps 606, 608, 610 and 612.

After start step 602, based on the current state of the Bluetooth® module 306 shown in FIG. 3, it may be determined whether a command or sequence of commands requires Adaptive Frequency Hopping (AFH) to be disabled. This may be the case for various maintenance operations and in particular for link establishment between the Bluetooth® module 306 and another Bluetooth® device. If AFH needs to be disabled, AFH may be disabled at the Bluetooth® module 306 in step 610. In order to enhance the quality of the Bluetooth® and WLAN communications during the phase where AFH may be disabled, TDM may be enabled via the coexistence interface 316 shown in FIG. 3, in step 612. Returning to decision step 604, the Bluetooth® module may continue to check for any changes in AFH status. If, in step 604, AFH may be enabled, TDM may be disabled via the coexistence interface in step 606. AFH may be enabled in step 608 at the Bluetooth® module 306, illustrated in FIG. 3. Returning to decision step 604, the Bluetooth® module may continue to check for any changes in AFH status.

In accordance with an embodiment of the invention, a method and system for Bluetooth® and Wireless LAN coexistence may comprise controlling wireless local area network (WLAN) communication and Bluetooth® communication in a coexistence system that handles at least a WLAN communication protocol and a Bluetooth® communication protocol based on time division multiplexing (TDM) and adaptive frequency hopping (AFH), as illustrated in FIG. 1, FIG. 2, FIG. 3 and FIG. 6. Switching may occur between the WLAN communication and the Bluetooth® communication based on the TDM and the AFH, as illustrated in FIG. 3, for example. In one embodiment of the invention, the switching may occur adaptively. Notwithstanding, in instances where it may be determined that AFH is disabled, switching to TDM may occur, as explained for FIG. 6.

In accordance with an embodiment of the invention, a method and system for Bluetooth® and Wireless LAN coexistence may comprise controlling wireless local area network (WLAN) communication and Bluetooth® communication in a coexistence system that handles at least a WLAN communication protocol and a Bluetooth® communication protocol based on time division multiplexing (TDM) and adaptive frequency hopping (AFH), as illustrated in FIG. 1, FIG. 2, FIG. 3 and FIG. 6. In accordance with an embodiment of the invention, WLAN communication and/or Bluetooth® communication may be disabled based on a state of at the WLAN communication and/or the Bluetooth® communication, shown in FIG. 2, FIG. 3 and FIG. 6. Use of the AFH may be enabled based on a link status of the WLAN communication and/or the Bluetooth® communication, as explained for FIG. 6. Bluetooth® communication and/or WLAN communication may be disabled based on a state of the WLAN communication and/or the Bluetooth® communication. Use of the AFH may be enabled based on a link status of the WLAN communication and/or the Bluetooth® communication as shown in FIG. 6. A coexistence interface 316, shown in FIG. 3, may be utilized to communicate corresponding state information associated with the WLAN communication and the Bluetooth® communication between a WLAN radio 304a providing the WLAN communication and a Bluetooth® radio 306a providing the Bluetooth® communication. The coexistence interface 316 may comprise, for example, a 2-wire interface illustrated in FIG. 5A, a 3-wire interface illustrated in FIG. 5B or other suitable interface.

Another embodiment of the invention may provide a machine-readable storage, having stored thereon, a computer program having at least one code section executable by a machine, thereby causing the machine to perform the steps as described above for Bluetooth® and Wireless LAN coexistence.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments failing within the scope of the appended claims.

What is claimed is:

1. A method for providing wireless communication, the method comprising:
in a single-chip collocated coexistence system that includes a wireless local area network (WLAN) communication module and a Bluetooth communication module coupled via a coexistence interface,
determining a current link status of the Bluetooth communication module based on a command from a second Bluetooth communication module;
disabling adaptive frequency hopping (AFH) based on the current link status;
enabling, with the coexistence interface, time division multiplexing (TDM) in response to the disabling of AFH; and
adaptively switching between TDM and AFH based on a change in the current link status of the Bluetooth communication module.

2. The method according to claim 1, comprising switching communication between WLAN communication and Bluetooth communication based on said TDM and said AFH.

3. The method according to claim 1, comprising adaptively switching communication between WLAN communication and Bluetooth communication based on said TDM and said AFH.

4. The method according to claim 1, wherein the link status of the Bluetooth communication module corresponds to a connection setup operation.

5. The method according to claim 1, comprising enabling at least one of: WLAN communication and Bluetooth communication, based on a state of at least one of: said WLAN communication module and said Bluetooth communication module.

6. The method according to claim 1, comprising enabling use of said AFH based on a link status of at least one of: said WLAN communication module and said Bluetooth communication module.

7. The method according to claim 1, comprising communicating via the coexistence interface, corresponding state information associated with said WLAN communication module and said Bluetooth communication module.

8. The method according to claim 7, wherein said coexistence interface comprises a 2-wire interface.

9. The method according to claim 7, wherein said coexistence interface comprises a 3-wire interface.

10. The method according to claim 1, wherein the command corresponds to establishing a link between the Bluetooth communication module and the second Bluetooth communication module.

11. The method according to claim 1, wherein the command corresponds to maintenance operations between the Bluetooth communication module and the second Bluetooth communication module.

12. The method according to claim 1, wherein adaptively switching between TDM and AFH based on a change in the current link status of the Bluetooth communication module comprises:
enabling AFH responsive to availability of AFH resulting from the change in the current link status.

13. The method according to claim 12, further comprising:
disabling, with the coexistence interface, TDM in response to enabling AFH.

14. The method according to claim 1, wherein adaptively switching between TDM and AFH is performed based on AFH having a higher priority relative to TDM.

15. A method for providing wireless communication, the method comprising:
in a single-chip collocated coexistence system utilizing at least a first wireless communication module and a second wireless communication module,
determining a current link status of the second wireless communication module based on a command from a third wireless communication module external to the single-chip collocated coexistence system;

disabling adaptive frequency hopping (AFH) based on the current link status;

enabling time division multiplexing (TDM) in response to the disabling of AFH; and adaptively switching between TDM and AFH based on a change in the current link status of the second wireless communication module.

16. The method according to claim 15, wherein said first wireless module comprises a wireless local area network (WLAN) communication module.

17. The method according to claim 15, wherein said second wireless module comprises a Bluetooth communication module.

18. The method according to claim 15, wherein said third wireless module comprises a Bluetooth communication module.

19. A single-chip collocated coexistence system for providing wireless communication, the system comprising:

a wireless local area network (WLAN) communication module configured to communicate via a WLAN communication protocol;

a Bluetooth communication module configured to communicate via a Bluetooth communication protocol, wherein the Bluetooth communication module is further configured to disable adaptive frequency hopping (AFH) based on a current link status of the Bluetooth communication module determined according to communication with a second Bluetooth communication module;

a coexistence interface coupled between the WLAN communication module and the Bluetooth communication module, wherein the coexistence interface is configured to enable time division multiplexing (TDM) in response to the disabling of AFH;

wherein the Bluetooth communication module adaptively switches between TDM and AFH based on a change in the current link status of the Bluetooth communication module.

20. The system according to claim 19, further comprising a host processor configured to switch communication between WLAN communication and Bluetooth communication based on said TDM and said AFH.

21. The system according to claim 19, further comprising a host processor configured to adaptively switch communication between WLAN communication and Bluetooth communication based on said TDM and said AFH.

22. The system according to claim 19, further comprising a host processor configured to enable at least one of: WLAN communication and Bluetooth communication, based on a state of at least one of: said WLAN communication module and said Bluetooth communication module.

23. The system according to claim 19, further comprising a host processor configured to enable use of said AFH based on the change in the current link status of at least one of: said WLAN communication module and said Bluetooth communication module.

24. The system according to claim 19, wherein said coexistence interface communicates corresponding state information associated with WLAN communication and Bluetooth communication between a WLAN radio providing said WLAN communication and a Bluetooth radio providing said Bluetooth communication.

25. The system according to claim 24, wherein said coexistence interface comprises a 2-wire interface.

26. The system according to claim 24, wherein said coexistence interface comprises a 3-wire interface.

27. A single-chip collocated coexistence system for providing wireless communication, the system comprising:

a first wireless communication module configured to communicate via a first wireless protocol;

a second wireless communication module configured to communicate via a second wireless protocol, wherein the second wireless communication module is further configured to disable adaptive frequency hopping (AFH) based on a current link status of the second wireless communication module determined according to communication with a third wireless communication module;

a coexistence interface coupled between the first and second wireless communication modules configured to enable time division multiplexing (TDM) in response to the disabling of AFH;

wherein the second wireless communication module adaptively switches between TDM and AFH based on a change in the current link status of the second communication module.

28. The system according to claim 27, wherein said first wireless protocol comprises wireless local area network (WLAN).

29. The system according to claim 27, wherein said second wireless protocol comprises Bluetooth.

30. The system according to claim 27, wherein said second wireless communication module determines whether said AFH is disabled.

* * * * *